Aug. 21, 1956     Q. A. KERNS     2,760,158
METHOD AND APPARATUS FOR MEASURING ELECTRICAL CURRENT
Filed July 7, 1952
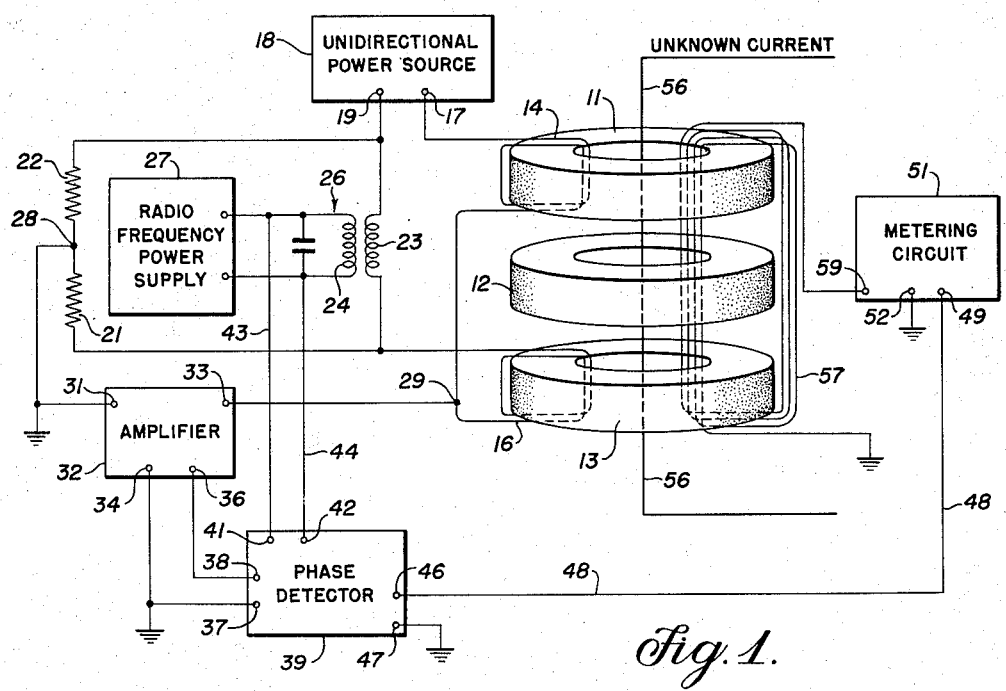
*Fig. 1.*
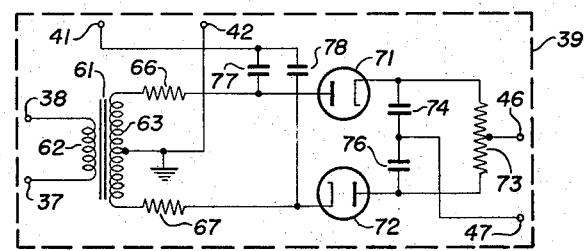
*Fig. 2.*
*Fig. 4.*
*Fig. 3.*
INVENTOR.
QUENTIN A. KERNS
BY
Roland A. Anderson
ATTORNEY.

United States Patent Office 2,760,158
Patented Aug. 21, 1956

2,760,158

METHOD AND APPARATUS FOR MEASURING ELECTRICAL CURRENT

Quentin A. Kerns, Berkeley, Calif., assignor to the United States of America as represented by the United States Atomic Energy Commission Application July 7, 1952, Serial No. 297,536

3 Claims. (Cl. 324—99)

The present invention relates to a method and apparatus for measuring electrical current and more particularly to a method and apparatus for measuring a current having unidirectional and alternating components.

While many devices have been developed to measure alternating current, and the same is true for measuring unidirectional currents, very few types of such devices are adaptable for measuring a current having a unidirectional and an alternating component. Where it is not desirable or feasible to insert, by direct connection, a measuring device into the circuit carrying the current to be measured, the latter type devices are still less numerous because current transformers of the conventional type will not transform unidirectional voltages.

In the instance where breaking into the system carrying an unknown current is feasible, it will be readily apparent that an oscilloscope provides a simple means of measuring such current when there is present both unidirectional and alternating components. In such instance a voltage may be developed proportional to the current and displayed upon the screen of a calibrated oscilloscope, thereby permitting determination of the value of the current.

The present invention is useful in either of the aforementioned instances and particularly where it is not feasible to directly connect into the circuit carrying the unknown current.

It is therefore an object of the present invention to provide a new and improved method and apparatus for measuring electrical current.

Another object of the present invention is to provide a new and improved method and apparatus for measuring electrical currents having unidirectional and alternating components.

A further object of the present invention is to provide an apparatus for measuring unidirectional current and alternating current over a wide range of frequency.

Still another object of the invention is to provide an apparatus having a saturable reactor bridge for deevloping a voltage proportional to the unidirectional component of current to be measured, a transformer for developing a voltage proportional to the alternating component of such current, and means for combining the two voltages developed.

A still further object of the present invention is to provide an apparatus for measuring a current having alternating and unidirectional components which requires mere transformer coupling to the circuit carrying such current.

Other objects and advantages of the invention will be readily apparent in the following description and claims considered together with the accompanying drawing in which:

Figure 1 is a schematic block diagram of the invention;

Figure 2 is a wiring diagram of the phase sensitive detector as shown in Fig. 1;

Figure 3 is a wiring diagram of the metering circuit as shown in Fig. 1; and

Figure 4 is a schematic diagram of the saturable reactor bridge circuit of Fig. 1.

Referring to the drawing in detail, and Fig. 1 in particular, there are provided three ferromagnetic toroidal cores 11, 12, and 13 disposed in parallel relation with the transverse axis of each in alignment. A winding 14 having a predetermined number of turns, for example 50 turns, is disposed about one of the outer cores 11 while a similar winding 16, having the same number of turns, is mounted about the other outer core 13. For the purpose of the present invention the windings 14 and 16 are connected in series opposition so that the magnetic fields established in the respective cores 11 and 13, by a current flowing through the windings, are opposing. One end of the series-connected windings 14 and 16 is connected to one terminal 17 of a conventional unidirectional power supply 18 while the other end of the windings is connected to the other terminal 19 of the power supply through two series-connected resistors 21 and 22. To provide a radiofrequency bias voltage across the windings 14 and 16 a pick-up coil 23 is disposed adjacent to the inductance 24 of the tank circuit 26 of a conventional radiofrequency oscillator 27 and is connected with one end to the terminal 19 of the power supply 18 and the other end to the junction between the winding 16 and the resistor 21.

Considering the foregoing connections it will be readily apparent that a saturable reactor bridge circuit has been provided (see Fig. 4) from which unbalanced conditions will result in a radiofrequency output voltage appearing between a point 28 at the junction of the two resistors 21 and 22 and a point 29 at the junction of the two windings 14 and 16. To maintain such output voltages at a value with respect to ground the point 28 between the two resistors 21 and 22 is connected to ground and for amplification thereof the point is connected to one terminal 31 of a conventional amplifier 32, the other terminal 33 of which is connected to the point 29 between the two windings 14 and 16. The output terminals 34 and 36 of the amplifier 32 are respectively connected to two input terminals 37 and 38 of the phase detector 39, one terminal 37 being connected to ground. A second set of input terminals 41 and 42 is respectively connected by a pair of leads 43 and 44 to either side of the tank circuit 26 of the radiofrequency oscillator 27.

Thus, there is a radiofrequency voltage applied to the phase detector 39 from the radiofrequency power supply 27 and a second radiofrequency voltage applied from the saturable reactor bridge circuit. Such radiofrequency voltages are compared within the phase detector 39 to develop a unidirectional voltage across output terminals 46 and 47 thereof. The description and operation of phase detector 39 will be set forth in greater detail hereinafter. The output terminal 47 is connected to ground and the other terminal 46 is connected by a lead 48 to an input terminal 49 of a metering circuit 51 which is also provided with a grounded terminal 52.

The connections described in the foregoing provide an indication in the metering circuit 51 of a unidirectional component of an unknown current flowing along a wire 56 which is disposed through the central openings of the cores 11, 12, and 13 substantially parallel to the transverse axes thereof. To provide an indication of an alternating current flowing along the wire 56 a coil or winding 57, having a predetermined number of turns, for example 500 turns, is disposed about the three cores 11, 12, and 13 with one end connected to ground and the other end connected to an input terminal 59 of the metering circuit 51.

Referring to the phase detector 39 in detail (see Fig. 2)

there is provided a transformer 61 with one winding 62 thereof connected between the input terminals 37 and 38. The second winding 63 of the transformer 61 is provided with a grounded center tap and each end thereof is respectively connected to one end of two similar resistors 66 and 67. The other end of one resistor 66 is connected to the anode of a diode type tube 71 and the other end of the second resistor 67 is connected to the cathode of a second diode type tube 72. The other elements of the two diode tubes are connected together through a center-tapped resistor 73 with the center tap connected to one output terminal 46. Two series-connected capacitors 74 and 76, having equal characteristics, are connected across the center-tapped resistor 73 and the junction between such capacitors is connected to the grounded output terminal 47. To suitably apply the radio frequencyvoltage impressed between the input terminals 41 and 42 to the phase detector circuit, a connection is made from one terminal 41 to the junction between two series-connected coupling capacitors 77 and 78, having equal characteristics, which are connected between the anode of the tube 71 and the cathode of the tube 72, and a connection is made directly from the other terminal 42 to the grounded center tap of the second winding 63 of the transformer 61.

Considering operation of the phase detector 39, it will be readily apparent that a continuous radiofrequency voltage is applied simultaneously to the anode of one diode tube 71 and to the cathode of the other diode tube 72. Each diode tube 71 and 72 will then be conductive alternately during each cycle of the radiofrequency voltage; i. e., one diode 71 will be conductive during the positive half cycle and the other diode 72 during the negative half cycle. The net result will then be such that no voltage difference exists between the center tap of the resistor 73 and ground. If under such condition a radiofrequency voltage appears between the input terminals 37 and 38, the zero voltage point of the center-tapped resistor will be shifted away from the center tap and a unidirectional voltage appears between the output terminals 46 and 47. Since the radiofrequency voltage at the input terminals 37 and 38 is impressed on one winding 62 of the transformer 61, a radiofrequency voltage having a 180 degree phase differential is induced across the center-tapped winding 63 of the transformer 61. Thus at a given time one end of the winding 63 is positive with respect to the grounded center tap thereof and the other end is negative with respect to such center tap. It will therefore be seen that should the unbalance voltage across the transformer 61 be in phase with the radiofrequency voltage applied from the power supply 27, the two voltages will be additive at one diode tube and subtractive at the other diode tube. Also, if such voltages are 180 degrees out of phase, the reverse voltage condition will exist at the diode tubes 71 and 72. In such manner conduction of the diode tubes 71 and 72 is controlled according to the unbalance voltage at the input terminals 37 and 38 so that a unidirectional voltage appears from the center tap of the resistor 73 to ground which is proportional to such unbalance voltage and is of such a sign as to be determinative of the phase relation between the unbalance and radiofrequency voltages.

Referring now to the metering circuit 51 in detail, it will be noted that the unidirectional voltage at the output terminals 46 and 47 of the phase detector 39 is impressed across the input terminals 49 and 52. One input terminal 49 is connected to the control grid of an amplifier tube 81 through a current limiting resistor 82 while the grounded input terminal 52 is connected to the cathode of such tube through a cathode resistor 83. To supply a suitable operating voltage, there is provided a conventional power supply 84 having a positive terminal 86, a neutral terminal 87 which is connected to the grounded terminal 52, and a negative terminal 88 with the positive terminal 86 connected to the anode of the tube 81 through a dropping resistor 89. Direct current coupling is provided between the anode of the tube 81 and the control grid of a cathode follower tube 91. Such coupling comprises a capacitor 92 connected between the anode of the tube 81 and the control grid of the tube 91 with a series-connected neon glow tube 93 and resistor 94 connected in parallel therewith, and three series-connected resistors 96, 97, and 98 connected between the junction of the glow tube 93 and resistor 94 and the cathode of the tube 81 with the junction between the first two of the resistors 96 and 97 connected to the negative terminal 88 of the power supply 84. The anode of the tube 91 is directly connected to the positive terminal 86 of the power supply 84 while the cathode thereof is connected to the terminal 59 through a parallel-connected capacitor 101 and resistor 102. To provide a negative feedback connection in the amplifier circuit just described, a parallel-connected combination of a resistor 103 and capacitor 104 is connected between the terminal 59 and control grid of the tube 81. A voltmeter 106, or similar voltage measuring device, is provided with a terminal 107 connected to the junction between the resistors 97 and 98 and to the cathode of the tube 91 while a second terminal 108 is connected to the grounded terminal 52. Thus, there is provided a wide band amplifier measuring circuit for the present invention.

Consider now the operation of the invention connected in the manner described in the foregoing with the power supplied suitably energized and with an unknown current flowing along the wire 56. Under such conditions the cores 11 and 13 are excited by the windings 14 and 16, respectively, so that a magnetic flux is present in each which is proportional to the ampere-turns of such windings. Preferably the current flow through the windings 14 and 16, due to the unidirectional power supply 18, is established so that the value of the magnetic flux never reaches the saturation point of the magnetic material employed in the cores 11, 12, and 13. It is to be noted that the windings 14 and 16 are connected in series opposition so that the magnetic flux in the one core 11 is in the opposite direction with respect to the magnetic flux in the other core 13. Thus, a balanced condition exists in the saturable reactor bridge circuit (see Fig. 4) with respect to the applied radio frequency voltage from the powed supply 27; i. e., the reactive impedance of one winding 14 and one resistor 22 is equal to the reactive impedance of the other winding 16 and the other resistor 21 so that the voltage between the two points 28 and 29 of the bridge is zero. The latter condition exists until a current having a unidirectional component flows along the conductor 56 which forms a single turn winding on the cores 11, 12, and 13.

Two further conditions may exist with respect to the saturable reactor bridge circuit in which instances an unbalance occurs and a radiofrequency voltage appears between the points 28 and 29. One such condition results when the current flowing along the conductor 56 has a unidirectional component such that the resulting magnetic flux in one of the cores 11 is additive (in the same direction) to the existing flux due to the unidirectional current flowing through the winding 14 about such core. With such current flow along the conductor 56 the opposite result will exist in the other core 13; i. e., the magnetic flux established in the core 13 by the unidirectional component of the current flowing along the conductor 56 will be subtractive (in the opposite direction) from the existing flux in the core. Under such circumstances, it will be readily apparent, by application of the well-known principles of saturable reactors, that the reactive impedance of the first-mentioned winding 14 is decreased and that of the other winding 16 is increased. Thus a radiofrequency voltage, which is 180 degrees out of phase with the radiofrequency voltage impressed across the windings 14 and 16, appears between the two points 28 and 29.

The other, and remaining, condition of the saturable reactor bridge circuit results from a unidirectional component of current flowing along the conductor 56 in the opposite direction from that considered in the preceding paragraph. In this instance, applying the same reasoning, it is clearly apparent that the reactive impedance of the winding 14 is increased and that of the other winding 16 is decreased. Thus a radiofrequency voltage, which is in phase with the applied voltage, appears between the two points 28 and 29. From the foregoing, it is to be noted that a signal voltage is attained having a magnitude proportional to the magnitude of the unidirectional component of current flowing along the conductor 56 and that the phase of such signal voltage with respect to the applied radiofrequency voltage is indicative of the direction of flow of the unidirectional current (that is, the polarity thereof).

Such radiofrequency signal or unbalance voltages appearing between the points 28 and 29 are suitably applied to the amplifier 32 which amplifies the voltage and applies the output voltage thereof, in phase with the input, to the input terminals 37 and 38 of the phase detector 39. Having previously described the operation of the phase detector 39 in detail, it is only necessary to state that the transformer 61 provides a 180 degree phase change between the input and output thereof. Further, it is to be noted that the radiofrequency voltage impressed at the second set of input terminals 41 and 42 of the phase detector 39 is taken directly from the power supply 27 whereas the voltage applied across the windings 14 and 16 is taken by inductive coupling from the tank circuit 26, the latter coupling introducing a 180 degree phase shift. Considering the foregoing, it is apparent that when the unidirectional component of current along the conductor 56 is such as to decrease the inductive reactance of the winding 14 a radiofrequency voltage is developed between the points 28 and 29 which is 180 degrees out of phase with the voltage across the pick-up coil 23 and thereby in phase with the voltage impressed at the input terminals 41 and 42 of the phase detector. Thus, the radiofrequency voltage from the points 28 and 29 of the bridge circuit and the applied radiofrequency at the terminals 41 and 42 of the phase detector 39 will be such that a negative unidirectional signal voltage appears between the output terminals 46 and 47 of the phase detector. From the foregoing, it will also be seen that when the unidirectional component of the current along the conductor 56 is such that the inductive reactance of the winding 14 increases, a positive unidirectional signal voltage appears between the output terminals 46 and 47 of the phase detector 39.

The output voltage of the phase detector 39 which appears across the output terminals 46 and 47 is impressed directly across the input terminals 49 and 52 of the metering circuit 51 to vary conduction of the amplifier tube 81. Since the anode of the tube 81 is coupled to the control grid of the cathode follower tube 91, there is a 180 degree phase inversion between the voltages of the two control grids. Thus, a negative signal voltage applied between the terminals 49 and 52 appears as a positive signal across the cathode resistor 102 of the tube 91 because of increasing conduction of such tube. As the tube 91 conducts current flows through the winding 57 in such a manner that a magnetic flux is established in the cores 11, 12, and 13 to oppose and cancel the magnetic flux established by the unidirectional component of current flowing along the wire 56. It is therefore readily apparent that, since the foregoing action is instantaneous, the device as described is a null device which operates in continuous balance. Thus, a measurement of the voltage between the cathode of the tube 91 and ground affords an indication of the unidirectional component of the current flowing along the conductor 56. A positive signal voltage between the input terminals 49 and 52 results in a negative voltage at the cathode of the tube 81 which is indicative of a current flow through the winding 57 in a direction to again cause the cancellation of the magnetic flux in the cores 11, 12, and 13 because of the current flowing along the conductor 56.

Now consider the instance where the current flowing along the conductor 56 contains a radiofrequency or alternating component. In such case it will be readily apparent that the net effect of such alternating component will be zero within the saturable reactor bridge because of the alternating characteristic and the fact that the two windings 14 and 16 are connected in series opposition. However, such alternating component of current will induce a proportional voltage across the winding 57 which is wound continuously about the three cores 11, 12, and 13, in the ordinary manner of current transformers. Since the winding 57 is included in the circuit across the voltage measuring device 106, the induced proportional voltage will be indicated in addition to the voltage proportional to the unidirectional component. Thus, there has been provided an indication of the current flowing along the conductor 56, including both the alternating and unidirectional components thereof, without making any direct connections to the conductor or the circuit of which it is a part.

It has been determined during use of the present invention that by providing a third core 12 inductance is added to the circuit of the winding 57 which reduces any unbalance current in such winding for a given unbalanced voltage to prevent the radiofrequency voltage of the oscillator 27 from appearing as an output signal. It is also to be noted that any harmonic frequencies or other frequencies of voltage appearing between the points 28 and 29 of the saturable reactor bridge will be canceled out across the resistor 73 of the detector circuit 39. The present invention has proven highly satisfactory in measuring current having both unidirectional and alternating components where the unidirectional component has covered a wide spread of values and the alternating component has covered a wide band of frequencies in addition to wide spread of values. The latter has been due to the use of negative feedback and proper selection of the values of the elements of the amplifier circuit utilized in the metering circuit 51.

While the salient features of the present invention have been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In a current monitoring device, the combination comprising at least two similar annular magnetizable core members, two similar coils wound one on each of said core members and connected in series opposition, a series circuit including a source of direct current and two equal series-connected resistors connected across said two coils, a source of radio-frequency current connected across said two resistors, a conductor carrying an unknown current extended through said core members as a single turn winding, a phase detector coupled to the junction between said two resistors and the junction between said two coils and adapted to produce a signal proportional to phase and magnitude of voltage between said junctions, a third coil wound on said two core members in inductive relation with said conductor, an amplifier having an input and an output with the input connected to said phase detector and the output connected across said third winding, said amplifier adapted to develop a flow of current in response to said signal through said third coil to establish a flux in said core members opposing flux established by said unknown current, and an indicator connected across said third coil for indicating the voltage across said third coil as a function of the unknown current of said conductor.

2. In a current monitoring device, the combination comprising at least two similar annular magnetizable core members, two similar coils wound one on each of said core members and connected in series opposition, a series circuit including a source of direct current and two equal series-connected resistors connected across said two coils, a source of radio-frequency current connected across said two resistors, a conductor carrying an unknown current extended through said core members as a single turn winding, a phase detector coupled to the junction between said two resistors and the junction between said two coils and adapted to produce a signal proportional to phase and magnitude of voltage between said junctions, a third coil wound on said two core members in inductive relation with said conductor, a metering circuit including a vacuum tube having at least an anode, control grid, and cathode with the cathode connected to said third coil, means connected between said phase detector and the control grid of said tube for driving said tube in response to said signal to produce a current flow in said third coil in a direction to establish a flux in said core members in opposition to the flux established by said unknown current, and an indicator included in said metering circuit and connected across said third coil for indicating the voltage across said third coil as a function of the unknown current of said conductor.

3. The combination of claim 2 further characterized by a third annular magnetizable core member disposed between said two core members with said third coil wound to include said third core member to increase the inductance of said third coil.

References Cited in the file of this patent

UNITED STATES PATENTS

| | | |
|---|---|---|
| 1,825,514 | Fitzgerald | Sept. 29, 1931 |
| 2,149,092 | Kettler | Feb. 28, 1939 |
| 2,338,732 | Nosker | Jan. 11, 1944 |
| 2,362,372 | Halfmann | Nov. 7, 1944 |
| 2,388,070 | Middel | Oct. 30, 1945 |
| 2,428,613 | Boyajian | Oct. 7, 1947 |
| 2,605,302 | Specht | July 29, 1952 |
| 2,631,188 | Clapp | Mar. 10, 1953 |